United States Patent [19]

Sexton

[11] 4,013,104

[45] Mar. 22, 1977

[54] DISPENSER FOR SHORTENING OR THE LIKE

[75] Inventor: Ronald R. Sexton, Soldotna, Alaska

[73] Assignee: Daniel B. Sexton, Soldotna, Alaska ; a part interest

[22] Filed: May 17, 1976

[21] Appl. No.: 686,921

[52] U.S. Cl. ............................. 141/18; 141/113; 141/280; 141/386; 222/49; 222/162

[51] Int. Cl.² ...................... B65B 3/10; B67D 5/64

[58] Field of Search ............... 141/18, 21, 22, 319, 141/357, 125, 113, 386, 280, 391; 222/49, 162

[56] References Cited

UNITED STATES PATENTS

| 1,595,889 | 8/1926 | Stevens | 141/319 X |
| 2,290,677 | 7/1942 | Delaney | 141/386 X |

Primary Examiner—Stanley H. Tollberg
Assistant Examiner—Hadd Lane
Attorney, Agent, or Firm—Seed, Berry, Vernon & Baynham

[57] ABSTRACT

An attachment suitable for attaching to standard sized cans of vegetable shortening or the like in which a two-piece clamp attaches to the top rim of the can to lock the clamp member against axial movement. The clamp member is provided with a central opening with a flange bordering one side of the opening and a wiping or cutting lip bordering the other side. A pusher plate fits in the bottom of the can and is supported by a longer, standard can or a push base. A cylinder is fitted over the central opening and locked within the flange against axial movement. A plunger fits in the cylinder. The shortening is dispensed by pushing against the clamping member which moves the can down about the push plate forcing shortening up through the central opening into the cylinder. The plunger moves up until index marks on the plunger indicate the desired amount of shortening has been extruded. The cylinder is removed by laterally sliding the cylinder across the cutting lip to cleanly sever the shortening in the cylinder from that remaining in the can.

12 Claims, 4 Drawing Figures

DISPENSER FOR SHORTENING OR THE LIKE

BACKGROUND OF THE INVENTION

1. Field of the Invention

This invention pertains to dispensers of the type suitable for moving measured amounts of vegetable shortening or the like out of a standard sized can, and more particularly, for attachments which may be reused once the contents of the can have been exhausted.

2. Description of the Prior Art

It is a well known problem to users of vegetable shortening, or other products of a semi-solid extrudible consistency which require measured amounts during use of the product, that obtaining an accurate measurement is generally time consuming and difficult. One attempt to make such measurement more easily obtained is shown in U.S. Pat. No. 3,273,608. This patent shows a manufactured can in which a dispensing device is integrally manufactured into the can. The dispensing device includes a slidable follower having a central hole over which is seated a cylindrical chamber. Downward movement of the follower and chamber is stated in the patent as causing the shortening to extrude up into the chamber. After the chamber is filled, and removed from the slidable follower, a disc in the chamber is pushed down clearing the extruded product from the chamber.

Such prior art attempts at providing dispensing devices as in the patent have not been satisfactory for several reasons: First, to extrude vegetable shortening would require approximately 50 pounds of pressure which it is doubtful could be applied on the disc shown in U.S. Pat. No. 3,273,608 especially as the disc gets lower into the can. Secondly, the slidably following cylinder in the patent is removed from the slidably follower by axial movement frequently leaving a peak or portion of shortening sticking to the shortening in the can thus not assuring a cleanly cut surface of the shortening dispensed and thus not assuring an accurate measurement. Still further, the dispenser being made an integral part of the can increases the cost of each can making the dispensing attachment cost prohibitive. Various other difficulties are present with the prior art dispenser shown in the patent which are overcome by the invention of this patent application.

SUMMARY OF THE INVENTION

It is an object of this invention to provide an attachment for dispensing shortening or like semi-solid extrudible products from standard sized cans.

It is another object of this invention to provide an attachment for dispensing shortening or other similar products by moving the can axially relative to the shortening.

It is another object of this invention to provide a shortening dispenser attachment which provides an accurately measured quantity of dispensed shortening.

It is still another object of this invention to provide a dispenser for shortening or other like semi-solid extrudible products which is inexpensive to manufacture and may be reusable.

These objects are best obtained in the broadest aspect by providing an attachment which fits over the open end of a can of shortening or the like with a clamping member having a central opening through which shortening can be extruded. A cylinder is fitted over the opening to receive the shortening and a plunger is slidably arranged in the cylinder. A pusher plate is fitted into an opened bottom of the can and the pusher plate is seated on a base or other can having a height greater than the shortening can. The shortening is extruded by pressing down on the can forcing the pusher plate up through the can extruding product out into the cylinder. In the preferred embodiment of the invention, the apparatus is suitable as an attachment which can be removed and reused for additional cans. In the preferred embodiment the clamping member locks about the top rim or bead of the can to prevent axial movement of the clamping member on the can and prevent extrusion of shortening out around the bead of the can. Also in the preferred embodiment, the central opening in the clamping member is bordered on one side by a semicircular flange which locks the cylinder against axial movement but leaves the cylinder free for sliding movement. The other half of the opening is bordered by a semicircular cutting lip against which the cylinder can be wiped to cleanly sever the shortening in the cylinder from that remaining in the can.

The advantages of the dispenser are apparent. First, the dispenser can be transferred from one container to another. Secondly, since downward pressure on the can is used, it can be applied with the palms of the user's hands allowing considerable pressure to be brought to bear on the can. Still further, substantially all of the shortening can be dispensed from the can. The downward pressure needed is much smaller than prior art devices, approximately 20 to 25 pounds for standard vegetable shortening when the shortening is at normal room temperature. Still another advantage is that the cylinder is able to slide laterally completely across the central opening to make a clean cut of the shortening. Another advantage is that by putting index indicia on the plunger, a very accurate measurement of the shortening within the cylinder can be obtained.

BRIEF DESCRIPTION OF THE FIGURES OF THE DRAWING

FIG. 2 illustrates the dispenser prior to extruding any shortening.

FIG. 3 illustrates the dispenser when a measured amount of shortening has been moved into the cylinder.

FIG. 4 illustrates the wiping or cutting action in which the cylinder can be removed solely by sliding laterally.

DETAILED DESCRIPTION OF THE PREFERRED EMBODIMENTS

Figure 1:
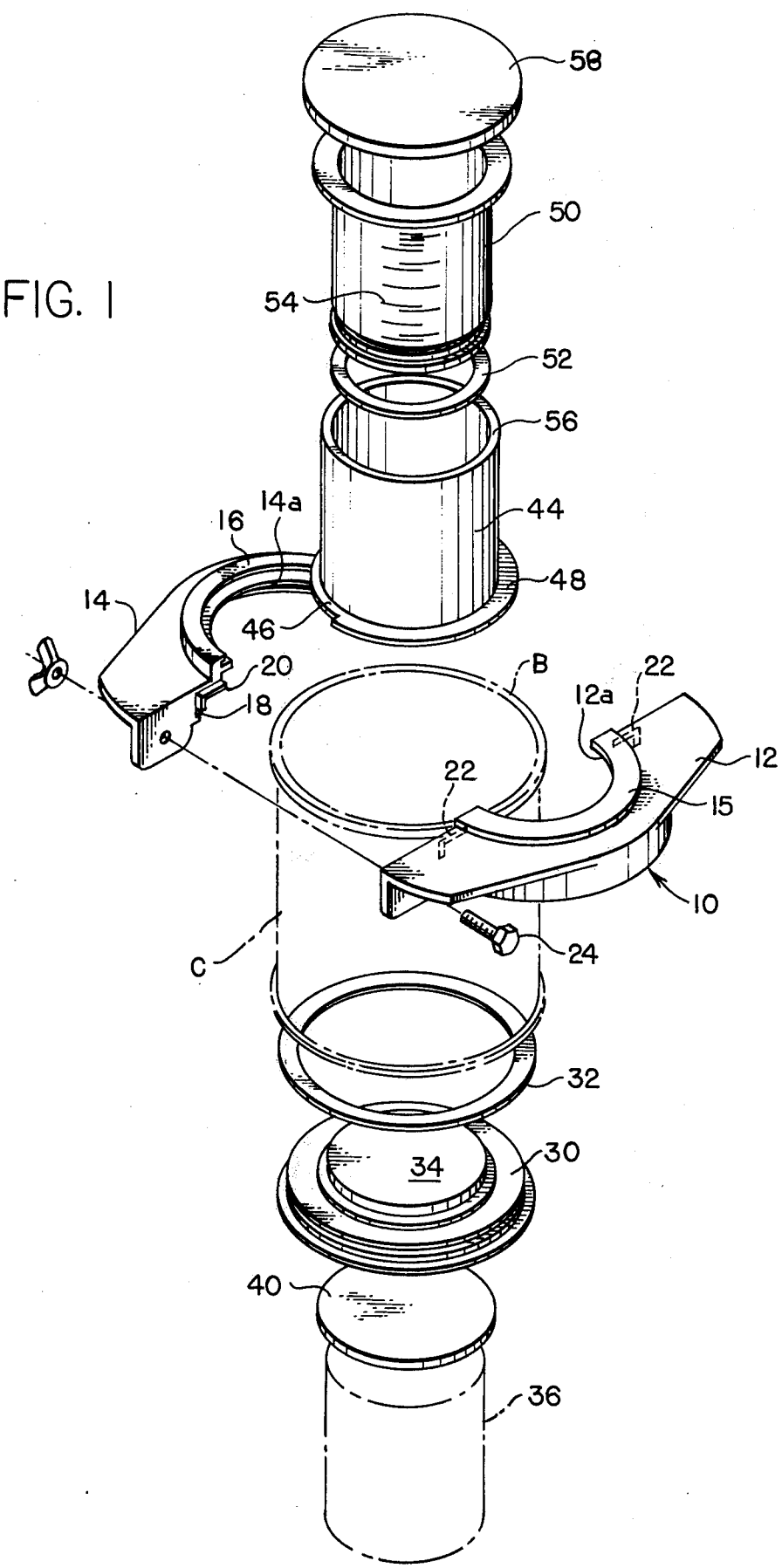
FIG. 1 is an exploded isometric of the dispenser attachment.
Figure 2:
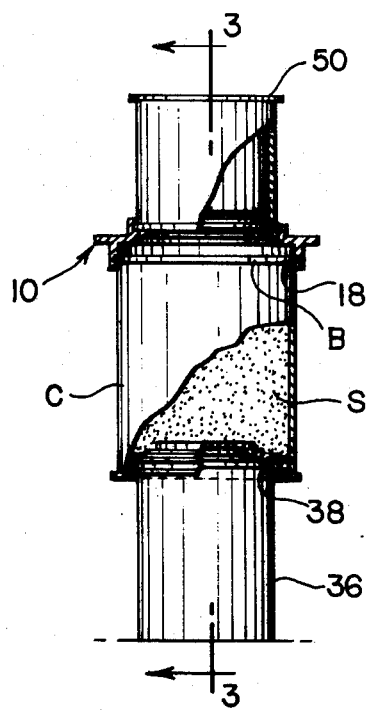
FIGS. 2–4 are fragmentary, schematic vertical sections, with parts broken away for clarity illustrating the operating principles of the dispenser attachment.

As best shown in FIG. 1 the dispensing device includes a clamp 10 formed of two clamping members 12 and 14. Each clamping member has a semicircular recess 12a and 14a, respectively. Recess 12a is bordered by a semicircular flat cutting lip 15 whereas recess 14a is bordered by a flange 16 which is a locking flange as will be described later. Each clamping member has a semicircular notch 18 that fits around the bead B or upper rim of a standard can C. This notch is best shown in FIG. 2 and when the clamping members are drawn together tightly, the notches form a tight seal around the top bead of the can so that the clamp cannot be moved axially nor can shortening be squeezed out around the bead of the can. In order to more tightly secure the clamping members against relative movement, each member is provided with a pair of tongues 20 which fit into grooves 22. A pair of bolts 24 connect the two clamping members together with the tongues 22 being guided into the grooves 20 to guide the clamping members tightly around the bead of the can.

The bottom of the can C is removed and replaced by a pushing plate 30 having a circumferential rubber seal 32 and a raised boss 34 that can fit within the central opening formed by the recesses 12a–14a. A suitable can or push base 36 of a height at least as great as the can, and preferably greater, is fitted within one of a variety of chamfered recesses 38 in the underside of the push plate. The various sized recesses allow different diameter push bases or cans to be used. In the preferred embodiment, the push base is a suitable hollow can having its own lid 40 so that it can be used as a storage container and will always be available next to the shortening can.

Seated centrally over the opening 12a–14a is a measuring cylinder 44 having a lower ridge 46 that is slidably received in the flange 16. The ridge has an extended portion 48 which seats over the cutting lip 15 to align the cylinder over the central opening and to locate the measuring indicia as will be explained. Furthermore, the extended portion covers the cutting lip and keeps it clean. As is best shown in FIG. 4, the cylinder can be completely removed from the clamp by sliding it laterally thus cutting off the shortening cleanly at the cutting lip.

Slidably seated within the cylinder 44 is a hollow plunger 50 having a rubber gasket 52 which forms a tight, slidable seal within the inside surface of the cylinder 44. The seal cleans the wall of the cylinder and prevents extrusion of shortening up along the sides of the plunger. The plunger is provided with measuring indicia 54 which are alignable with the top edge 56 of the measuring cylinder for establishing a quantity of shortening extruded into the cylinder by the extent of vertical movement of the plunger within the cylinder. In the preferred embodiment, the plunger is provided with a peripheral lip which limits downward movement of the plunger. The lip and open end is covered with a lid 58 so that the plunger can also serve as a storage compartment for various ingredients commonly used in baking.

Figure 3:
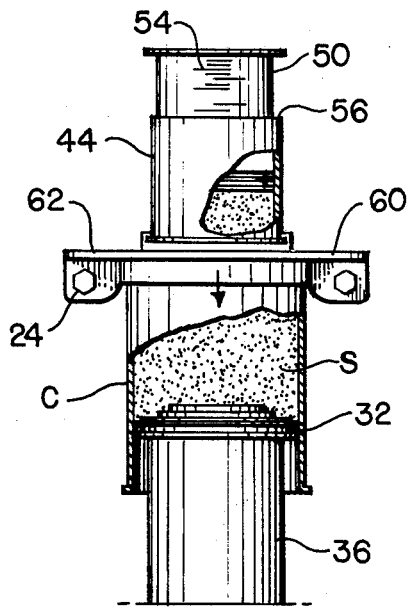
Figure 4:
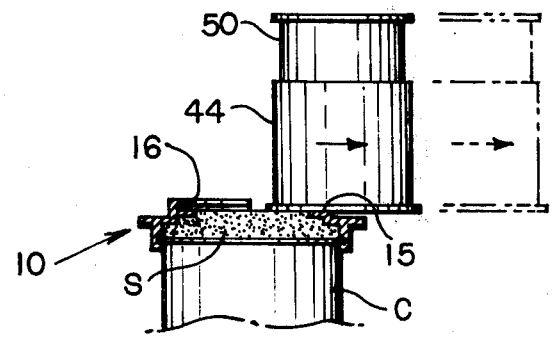

The operation of the device is best illustrated in FIGS. 2–4. The first operation is to remove the top and bottom of the shortening can to place the push plate with its gasket up into the inside of the can as best shown in FIG. 2. Next the clamp is tightly secured over the bead as also shown in FIG. 2. Next the push plate is set on a push base 36. Downward movement of the can is achieved by pressing with the heels of the hand against the lateral extended sufaces 60 and 62 which protrude from the clamp. This downward movement pushes the can down around the base 36 extruding shortening S up into the cylinder. Downward movement is continued until the desired amount of shortening is moved into the cylinder as determined by the location of the index marks 54 relative to the top edge of the cylinder 56. Since the gasket 32 can conform to the shape of the inside wall of the can, the gasket can still move over reasonable size dents in the can should the can have been dented during shipping. When the desired amount of shortening is in the cylinder, the cylinder is wiped over the cutting lip 15 as shown in FIG. 4. Finally, the plunger is pushed downwardly relative to the cylinder to extrude the shortening out of the cylinder into the cooking pot or other container.

While the preferred embodiment of the invention has been illustrated and described, it should be understood that variations will be apparent to one skilled in the art without departing from the principles described herein. For example, while the preferred embodiment is shown as an attachment, it should be understood that an integrally attached dispenser is also within the scope of the invention. Accordingly, the invention is not to be limited to the specific embodiment illustrated in the drawing.

The embodiments of the invention in which a particular property or privilege is claimed are defined as follows:

1. A dispenser for extrudible, semi-solid products such as vegetable shortening or the like comprising:
   a can having an open top, an open bottom, an upper bead surrounding the top, a smooth sidewall and containing the product,
   push means fitted within the bottom and having sealing means pressed against the can sidewall,
   clamp means surrounding the can upper bead and tightly secured thereto against movement axially of the can, said clamp means having an opening surrounded by a cutting lip and a holding flange and including force applying means for urging the can downwardly to extrude product upwardly through said opening,
   measuring cylinder means having a cylindrical central bore for receiving the product extruded and a ridge for slidably fitting beneath said holding flange but slidable laterally outwardly thereof over said cutting lip to cut the extruded product smoothly flush with said central bore,
   plunger means slidably fitted within said cylinder means and movable axially of said cylinder means as product is extruded into the cylinder means and movable to push the product from the cylinder means, and
   indexing means indicative of the quantity of product forced into the cylinder means.

2. The dispenser of claim 1, said force applying means including elongated horizontal surfaces extending from said clamp means and being engagable by the user's hands to push down on the clamp means and can, and including base means for holding the push means against downward movement as the can is moved downwardly.

3. The dispenser of claim 1, said ridge of said cylinder means when fitted within said flange of said clamp means holding the cylinder means against axial movement during extrusion of the product into the cylinder means, said cutting lip having a flat wiping surface for wiping the underside of said ridge to clearly cut off the product remaining in the can from product extruded into the cylinder means as the cylinder means is slid laterally out from said flange and past said cutting lip.

4. The dispenser of claim 1, said plunger means including a hollow body having an open end and a closed lower end, and closure means fitted over the open end for providing a closed storage chamber.

5. The dispenser of claim 3, said force applying means including elongated horizontal surfaces extending diametrically from said clamp means and being engagable by the user's hands to push down on the clamp means and can, further including brace means for holding the push means against downward movement as the can is moved downwardly, said push means having an underside which includes a plurality of circular recesses of varying diameter to fit a different size brace means.

6. A dispenser attachment for attaching to a standard sized can of shortening or other extrudible semisolid product, comprising:
   clamp means including first and second clamp members separable to be adapted to receive the bead of an open shortening can and, fastening means for fastening the clamp members together about the bead and adapted to lock the clamping members against axial movement on the can, said clamping members each having a central recess which, when the clamping members are connected together, forms a central opening, one said recess being bordered by a raised cutting lip, the other said recess being bordered by a holding flange,
   a push plate having a sealing member sized to be adapted to fit against the inside surface of the can,
   hollow cylinder means slidably engagable beneath the holding flange to hold the cylinder means against axial movement but allow sliding movement laterally over said cutting lip, and
   plunger means having sealing means slidably received in said cylinder means and having indexing indicia to determine a quantity of shortening extruded into said cylinder means.

7. The attachment of claim 6, said cylinder means having a ridge slidable beneath said holding flange and centering the cylinder means over said central opening.

8. The attachment of claim 7, said clamp means including pushing surfaces adapted to be engaged by a user to push the can downwardly, and base means adapted to support said push plate against downward movement so that pushing of the can downwardly moves the can downwardly causing the push plate to push shortening out through said central opening into said cylinder means.

9. A dispenser for standard cans of vegetable shortening or the like of a semi-solid extrudible consistency, comprising,
   pusher means centrally positioned on the can and having a central opening, pusher members extending laterally on the pusher means for pushing the can forcibly downward,
   a push plate sealingly fitted within the bottom of the can for movement axially within the can,
   cylinder means removably coupled to the pusher means for receiving shortening extruded by the push plate out of said central opening,
   plunger means slidably mounted within said cylinder means for upward movement an amount corresponding to the amount of shortening extruded, and
   base means of a transverse width less than said can but of a height greater than said can and seated against said push plate whereby downward pushing on said can against said base means moves said push plate upwardly relative to the can for extruding the shortening.

10. The dispenser of claim 9 wherein said central opening is bordered on one side by a flange holding the cylinder means against axial movement but allowing lateral sliding movement and bordered on the opposite side by a semi-circular cutting lip for wiping the cylinder as the cylinder is slid laterally to cut the shortening cleanly as the cylinder means is removed, and wherein said pusher means includes inner recesses adapted to lock tightly around the bead of a standard can.

11. The dispenser of claim 6, said fastening means including tongue and groove connectors interconnecting said first and second clamp members.

12. The dispenser of claim 9, said base means being hollow and having a cap for covering the base means to adapt it for use as a storage container.

* * * * *